(12) United States Patent
Fotiadis

(10) Patent No.: US 12,465,215 B2
(45) Date of Patent: Nov. 11, 2025

(54) MONITOR SYSTEM OF MULTIPLE PARKINSON'S DISEASE SYMPTOMS AND THEIR INTENSITY

(71) Applicants: PD Neurotechnology LTD, London (GB); Dimitrios Fotiadis, Ioannina (GR)

(72) Inventor: Dimitrios Fotiadis, Ioannina (GR)

(73) Assignee: PD NEUROTECHNOLOGY LTD, London (GB)

( * ) Notice: Subject to any disclaimer, the term of this patent is extended or adjusted under 35 U.S.C. 154(b) by 848 days.

(21) Appl. No.: 17/413,098

(22) PCT Filed: Dec. 14, 2018

(86) PCT No.: PCT/GR2018/000061
§ 371 (c)(1),
(2) Date: Jun. 11, 2021

(87) PCT Pub. No.: WO2020/120999
PCT Pub. Date: Jun. 18, 2020

(65) Prior Publication Data
US 2022/0022750 A1 Jan. 27, 2022

(51) Int. Cl.
*A61B 5/00* (2006.01)
*A61B 5/11* (2006.01)
(Continued)

(52) U.S. Cl.
CPC .......... *A61B 5/0024* (2013.01); *A61B 5/1101* (2013.01); *A61B 5/1123* (2013.01);
(Continued)

(58) Field of Classification Search
CPC . A61B 5/0205; A61B 5/02028; A61B 5/4842; A61B 5/024; A61B 5/026;
(Continued)

(56) References Cited

U.S. PATENT DOCUMENTS 10,182,746 B1 * 1/2019 Demiralp ........... A63B 24/0003
2005/0234309 A1 * 10/2005 Klapper ............... A61B 5/6828
600/300
(Continued)

FOREIGN PATENT DOCUMENTS

WO 2009/149520 A1 12/2009

OTHER PUBLICATIONS

Horne MK, McGregor S, Bergquist F. An objective fluctuation score for Parkinson's disease. PLoS One. Apr. 30, 2015;10(4):e0124522. doi: 10.1371/journal.pone.0124522. PMID: 25928634; PMCID: PMC4416005. (Year: 2015).*

(Continued)

*Primary Examiner* — Charles A Marmor, II
*Assistant Examiner* — Andrew E Hoffpauir
(74) *Attorney, Agent, or Firm* — Pillsbury Winthrop Shaw Pittman, LLP

(57) ABSTRACT

A system utilizing five or less body worn sensors may be used to profile the motor function of Parkinson's disease patients, integrate the outcome with patient self-reported information and translate the results to clinically relevant information, valuable for the monitoring of Parkinson's disease progression and symptom manifestation. The hardware of the system may deploy algorithms for the offline processing of the sensors' data, once the wearable monitoring devices are docked for charging, with no intervention required by the user. The system may also allow patients to mount the wearable devices featuring the sensors to any of a limited number of body parts, without taking care to mount each monitoring device to a specific body part. Finally, the system may allow a physician to register for a subscription-based service, pairing him/her with patients using the system, and granting him/her permission to remotely review the (Continued)

disease progression of the patients, as calculated by the system.

13 Claims, 16 Drawing Sheets

(51) Int. Cl.
  *G16H 40/67* (2018.01)
  *G16H 50/20* (2018.01)
  *G16H 80/00* (2018.01)
(52) U.S. Cl.
  CPC .......... *A61B 5/1126* (2013.01); *A61B 5/4082* (2013.01); *A61B 5/4842* (2013.01); *A61B 5/6801* (2013.01); *A61B 5/7285* (2013.01); *G16H 40/67* (2018.01); *G16H 50/20* (2018.01); *G16H 80/00* (2018.01); *A61B 2560/0456* (2013.01)
(58) Field of Classification Search
  CPC . A61B 5/0816; A61B 5/02007; A61B 5/6825; A61B 5/6829; A61B 5/7246; A61B 5/02438
  See application file for complete search history.

(56) References Cited

U.S. PATENT DOCUMENTS

| | | | | |
|---|---|---|---|---|
| 2010/0145236 | A1* | 6/2010 | Greenberg | G04G 21/025 600/595 |
| 2011/0098608 | A1* | 4/2011 | Griffiths | A61B 5/4082 600/595 |
| 2014/0122958 | A1* | 5/2014 | Greenebrg | A61B 5/6831 714/748 |
| 2016/0198996 | A1* | 7/2016 | Dullen | A61B 5/4824 600/595 |
| 2016/0249174 | A1* | 8/2016 | Patel | A61B 5/01 |
| 2017/0007168 | A1* | 1/2017 | Mirelman | A61B 5/6801 |
| 2017/0055880 | A1 | 3/2017 | Agrawal et al. | |
| 2017/0188895 | A1 | 7/2017 | Nathan | |
| 2017/0273601 | A1 | 9/2017 | Wang et al. | |
| 2018/0264320 | A1* | 9/2018 | Chang | A61B 5/1118 |
| 2018/0317826 | A1* | 11/2018 | Muhsin | G16H 40/67 |
| 2019/0172571 | A1* | 6/2019 | Ramaci | G16H 20/30 |
| 2019/0209022 | A1* | 7/2019 | Sobol | A61B 5/02055 |

OTHER PUBLICATIONS

Weenk, D., van Beijnum, B.J.F., Baten, C.T. et al. Automatic identification of inertial sensor placement on human body segments during walking. J Neuro Engineering Rehabil 10, 31 (2013). https://doi.org/10.1186/1743-0003-10-31 (Year: 2013).*
Kunze, Kai & Lukowicz, Paul & Junker, Holger & Tröster, Gerhard. (2005). Where am I: Recognizing On-body Positions of Wearable Sensors. Location-and Context-Awareness. 3479. 264-275. 10.1007/11426646_25. (Year: 2005).*
K. Kunze and P. Lukowicz, "Using acceleration signatures from everyday activities for on-body device location," 2007 11th IEEE International Symposium on Wearable Computers, Boston, MA, USA, 2007, pp. 115-116, doi: 10.1109/ISWC.2007.4373794. (Year: 2007).*
Vahdatpour A, Amini N, Xu W, Sarrafzadeh M. Accelerometer-based on-body sensor localization for health and medical monitoring applications. Pervasive Mob Comput. Dec. 2011;7(6):746-760. doi: 10.1016/j.pmcj.2011.09.002. PMID: 22347840; PMCID: PMC3279922. (Year: 2011).*
Rowlands et al., Accelerometer wear-site detection: When one site does not suit all, all of the time, Journal of Science and Medicine in Sport, vol. 20, Issue 4, 2017, pp. 368-372, ISSN 1440-2440, https://doi.org/10.1016/j.jsams.2016.04.013. (Year: 2017).*

Navid Amini, Majid Sarrafzadeh, Alireza Vahdatpour, Wenyao Xu, Accelerometer-based on-body sensor localization for health and medical monitoring applications, Pervasive and Mobile Computing, vol. 7, Issue 6, 2011, pp. 746-760, ISSN 1574-1192, https://doi.org/10.1016/j.pmcj.2011.09.002. (Year: 2011).*
International Search Report dated Oct. 7, 2019, issued in corresponding International Application No. PCT/GR2018/000061 (3 pgs.).
International Preliminary Report on Patentability and Written Opinion of the International Searching Authority dated Jun. 8, 2021, issued in corresponding International Application No. PCT/GR2018/000061 (10 pgs.).
Milica D. Djuric-Jovicic et al., "Automatic Identification and Classification of Freezing of Gait Episodes in Parkinson's Disease Patients", IEEE Transactions of Neural Systems and Rehabilitation Engineering, vol. 22, No. 3, May 2014, pp. 685-694.
J. Cancela et al., "A Comprehensive Motor Symptom Monitoring and Management System: The Bradykinesia Case", $32^{nd}$ Annual International Conference of the IEEE EMBS, Buenos Aires, Argentina, Aug. 31-Sep. 4, 2010, pp. 1008-1011.
C.D. Marsden, "The Mysterious Motor Function of the Basal Ganglia: The Robert Wartenberg Lecture", Neurology (Ny) 32, May 1982, pp. 514-539.
Samyra H.J. Keus et al., "Evidence-Based Analysis of Physical Therapy in Parkinson's Disease with Recommendations for Practice and Research", Movement Disorders, vol. 22, No. 4, 2007, pp. 451-460.
Margaret M. Hoehn MD et al., "Parkinsonism: onset, progression and mortality", Neurology, vol. 17, No. 5, May 1967, pp. 427-442.
Markos G. Tsipouras et al., "Automated Levodopa-Induced Dyskinesia Assessment", $32^{nd}$ Annual International Conference of the IEEE EMBS Buenos Aires, Argentina, Aug. 31-Sep. 4, 2010, pp. 2411-2414.
Walter Maetzler et al., "Progression of Parkinson's disease in the clinical phase: potential markers", Lancet Neurol. 2009; 8:1158-1171.
T. Eckert et al., "Increased pre-SMA activation in early PD patients during simple self-initiated hand movements", J. Neurol. 2006, 253: 199-207.
Markos G. Tsipouras et al., "An automated methodology for levodopa-induced dyskinesia: Assessment based on gyroscope and accelerometer signals", Artificial Intelligence in Medicine, 55 (2012), pp. 127-135.
Guido Alves MD et al., "Progression of motor impairment and disability in Parkinson disease", Neurology 65, Nov. 2005, pp. 1436-1441.
Jorge Cancela et al., "Wearability Assessment of a Wearable System for Parkinson's Disease Remote Monitoring Based on a Body Area Network of Sensors", Sensors 2014, 14, pp. 17235-17255.
J. Artieda et al., "Temporal Discrimination is Abnormal in Parkinson's Disease", Brain, (1992), 115, pp. 199-210.
George Rigas et al., "Tremor UPDRS Estimation in Home Environment", IEEE 2016, pp. 3642-3645.
George Rigas et al., "Assessment of Tremor Activity in the Parkinson's Disease Using a Set of Wearable Sensors", IEEE Transactions on Information Technology in Biomedicine, vol. 16, No. 3, May 2012, pp. 478-487.
George Rigas et al., "Real-Time Quantification of Resting Tremor in the Parkinson's Disease", $31^{st}$ Annual International Conference of the IEEE EMBS Minneapolis, Minnesota, USA, Sep. 2-6, 2009, pp. 1306-1309.
Jessica M. Kelly et al., "Recent Developments in Home Sleep-Monitoring Devices", International Scholarly Research Network ISRN Neurology vol. 2012, Article ID 768794, 10 pages.
Evanthia E. Tripoliti et al., "Automatic Detection of Freezing of Gait Events in Patients with Parkinson's Disease", Computer Methods and Programs in Biomedicine 110 (2013) pp. 12-26.
Ashburn et al., "Falls and Parkinson's Disease", Age and Ageing, 2001, 30: 3-4.
Meg E. Morris, "Movement Disorders in People With Parkinson's Disease: A Model for Physical Therapy", Physical Therapy, vol. 80, No. 6, Jun. 2000, pp. 578-597.

(56) References Cited

OTHER PUBLICATIONS

G.K. Kerr PhD et al., "Predictors of future falls in Parkinson Disease", Neurology 75, Jul. 13, 2010, pp. 116-124.
Ruth M. Pickering et al., "A Meta-Analysis of Six Prospective Studies of Falling in Parkinson's Disease", Movement Disorders, vol. 22, No. 13, 2007, pp. 1892-1900.
Susan C. Miller PhD et al., "The Role of Hospice Care in the Nursing Home Setting", Journal of Palliative Medicine, vol. 5, No. 2, 2002, pp. 271-277.
Martina Mancini et al., "Effects of Parkinson's Disease and Levodopa on Functional Limits of Stability", Clinical Biomechanics 23 (2008) pp. 450-458.
Anne Beuter et al., "Postural Sway and Effect of Levodopa in Early Parkinson's Disease", Can. J. Neurol. Sci. 2008, 35: 65-68.
Elizabeth Protas et al., "Gait and Step Training to Reduce Falls in Parkinson's Disease", Neurorehabilitation, Feb. 2005, pp. 183-190.
Jeffrey M. Hausdorff et al., "Gait Variability and Basal Ganglia Disorders: Stride-to-Stride Variations of Gait Cycle Timing in Parkinson's Disease and Huntington's Disease", Movement Disorders, vol. 13, No. 3, 1998, pp. 428-437.
O. Blin et al., "Quantitative analysis of gait in Parkinson patients: increased variability of stride length", Journal of the Neurological Sciences, 1990, 98: 91-97.
Joanna D. Schaafsma et al., "Gait dynamics in Parkinson's disease: relation to Parkinsonian features, falls and response to levodopa", Journal of the Neurological Sciences 212 (2003) 47-53.
Angelo Antonini, "Apomorphine and Levodopa Infusion Therapies for Advanced Parkinson's Disease", Journal of Movement Disorders 2009; 2:4-9.
A. Rodriquez-Molinero, "Letter to the Editor: Remote control of apomorphine infusion rate in Parkinson's disease: Real-time does variations according the patients' motor state", Parkinsonism and Related Disorders 21 (2015) pp. 996-998.
Sophie Drapier et al., "Apomorphine infusion in advanced Parkinson's patients with subthalamic stimulation contraindications", Parkinsonism and Related Disorders 18 (2012) 40-44.
George Rigas et al., "A decision support tool for optimal Levodopa administration in Parkinson's disease", IEEE 2010, 6 pgs.
Marko Bohanec et al., "A decision support system for Parkinson disease management: expert models for suggesting medication change", Journal of Decision Systems, 2018 https://doi.org/10.1080/12460125.20181469320 10 pgs.
Spyridon (Spyros) Papapetropoulos "Patient Diaries As a Clinical Endpoint in Parkinson's Disease Clinical Trials", CNS Neuroscience & Therapeutics 00 (2011) pp. 1-8.

\* cited by examiner

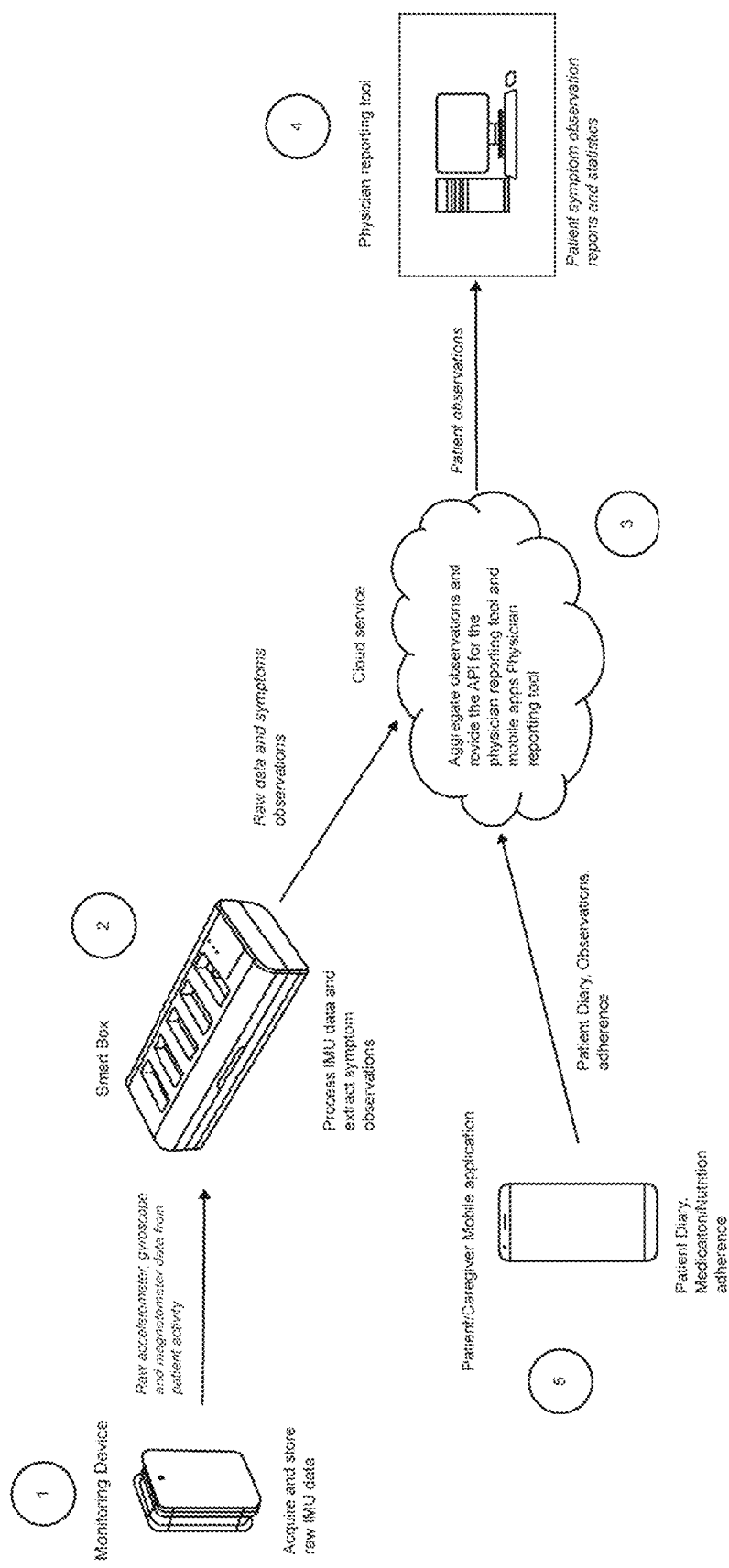
Figure 1 Invention ecosystem

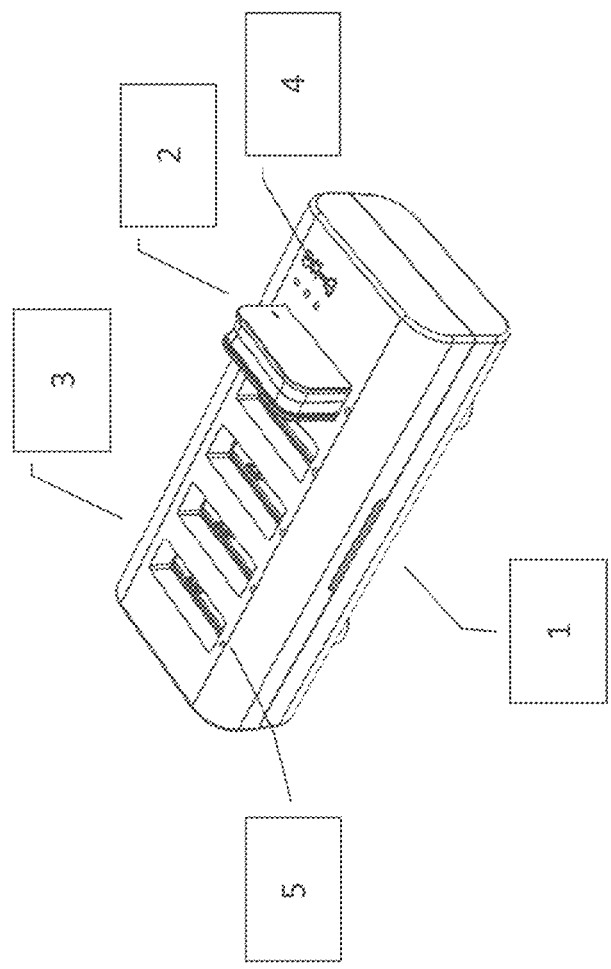
Figure 2 Computing device (Smart Box) with five docking slots using USB connectors and a docked MD

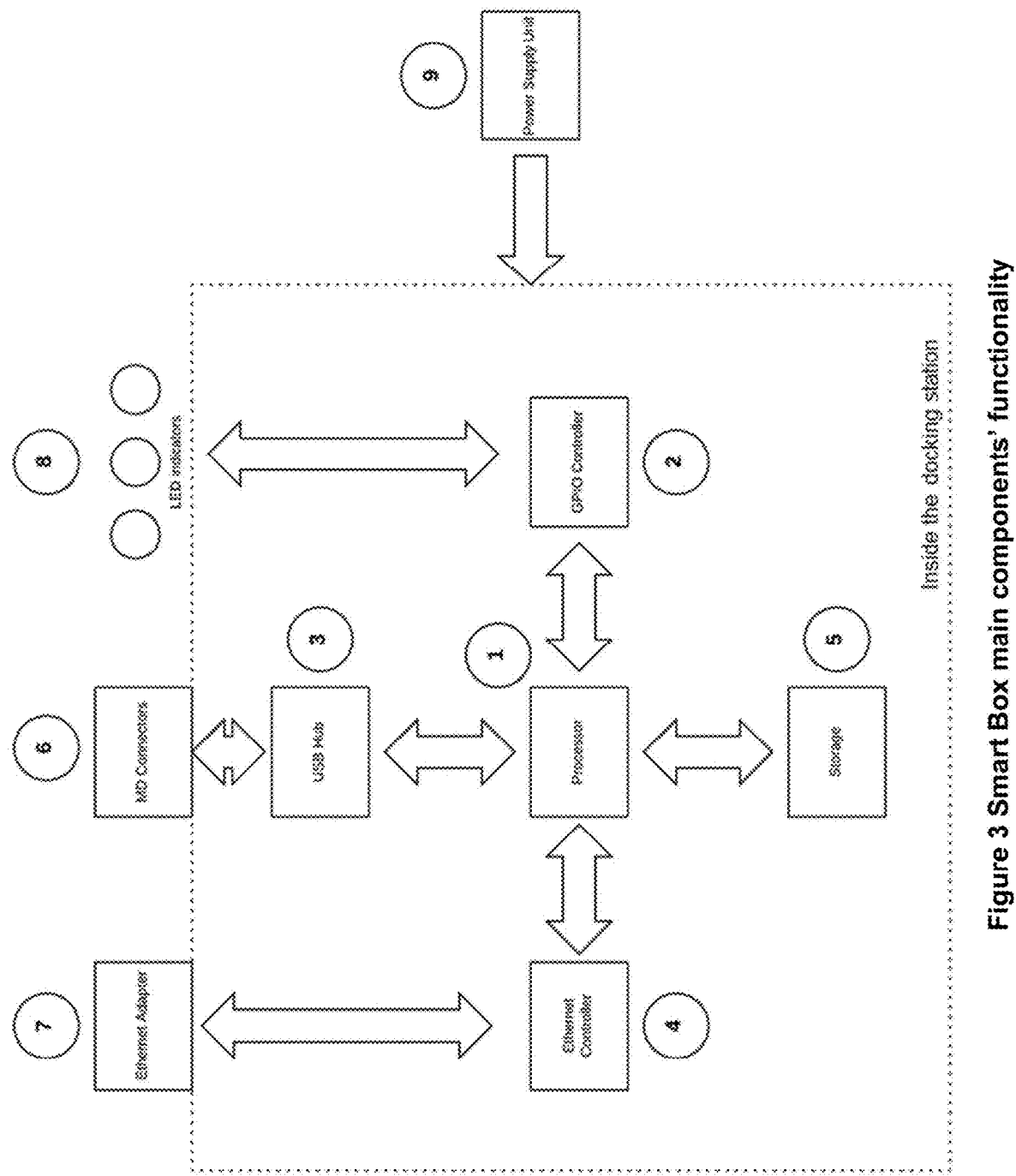
Figure 3 Smart Box main components' functionality

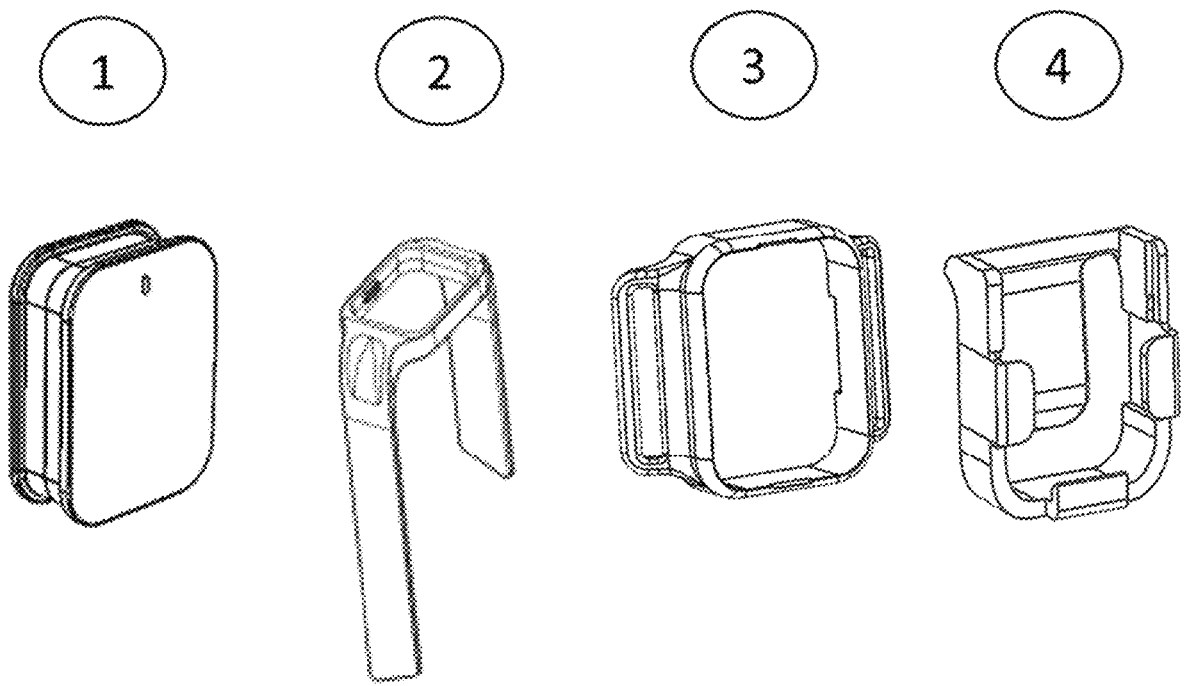
Figure 4 MD and accessories

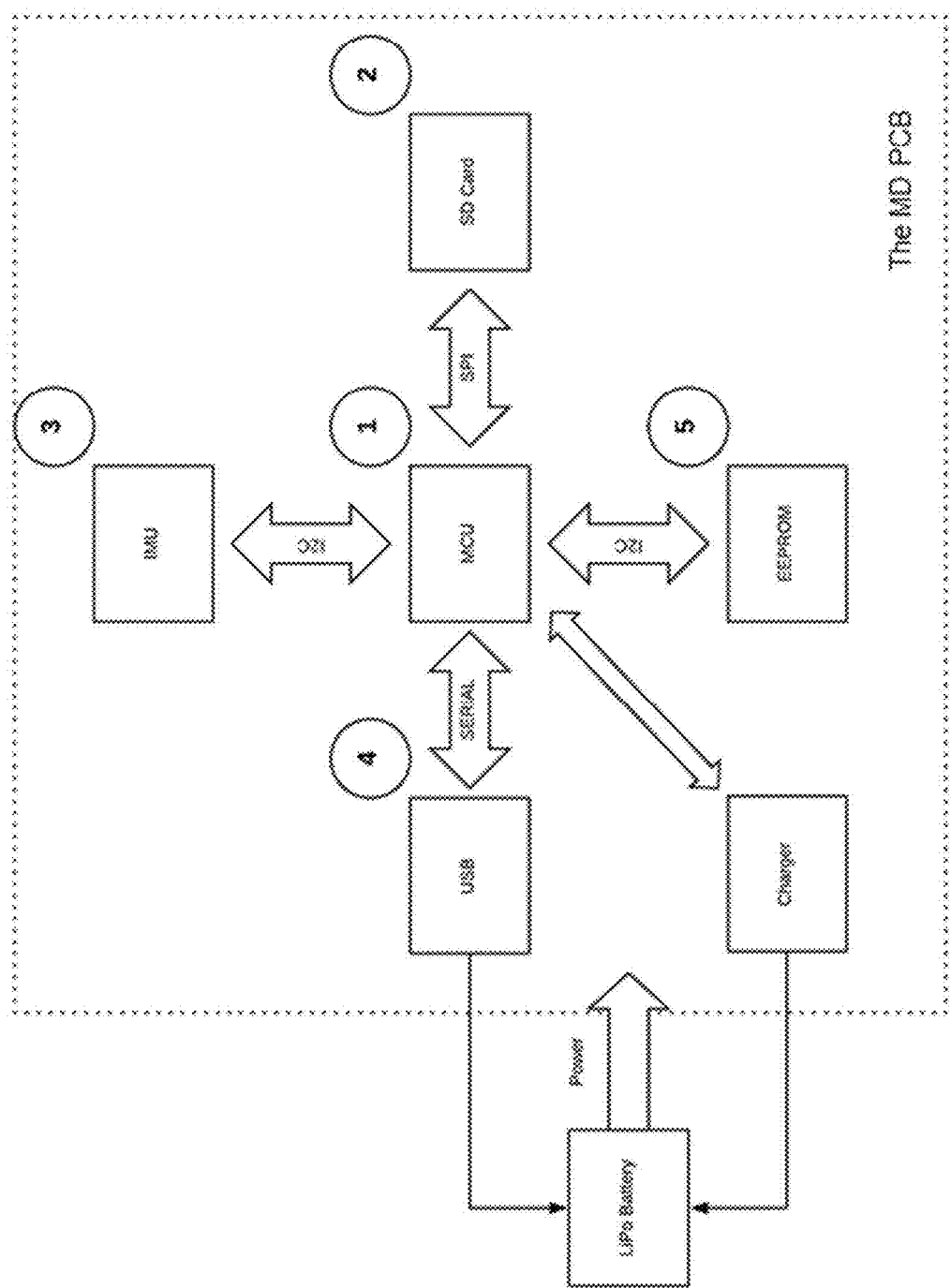
Figure 5 MD architecture

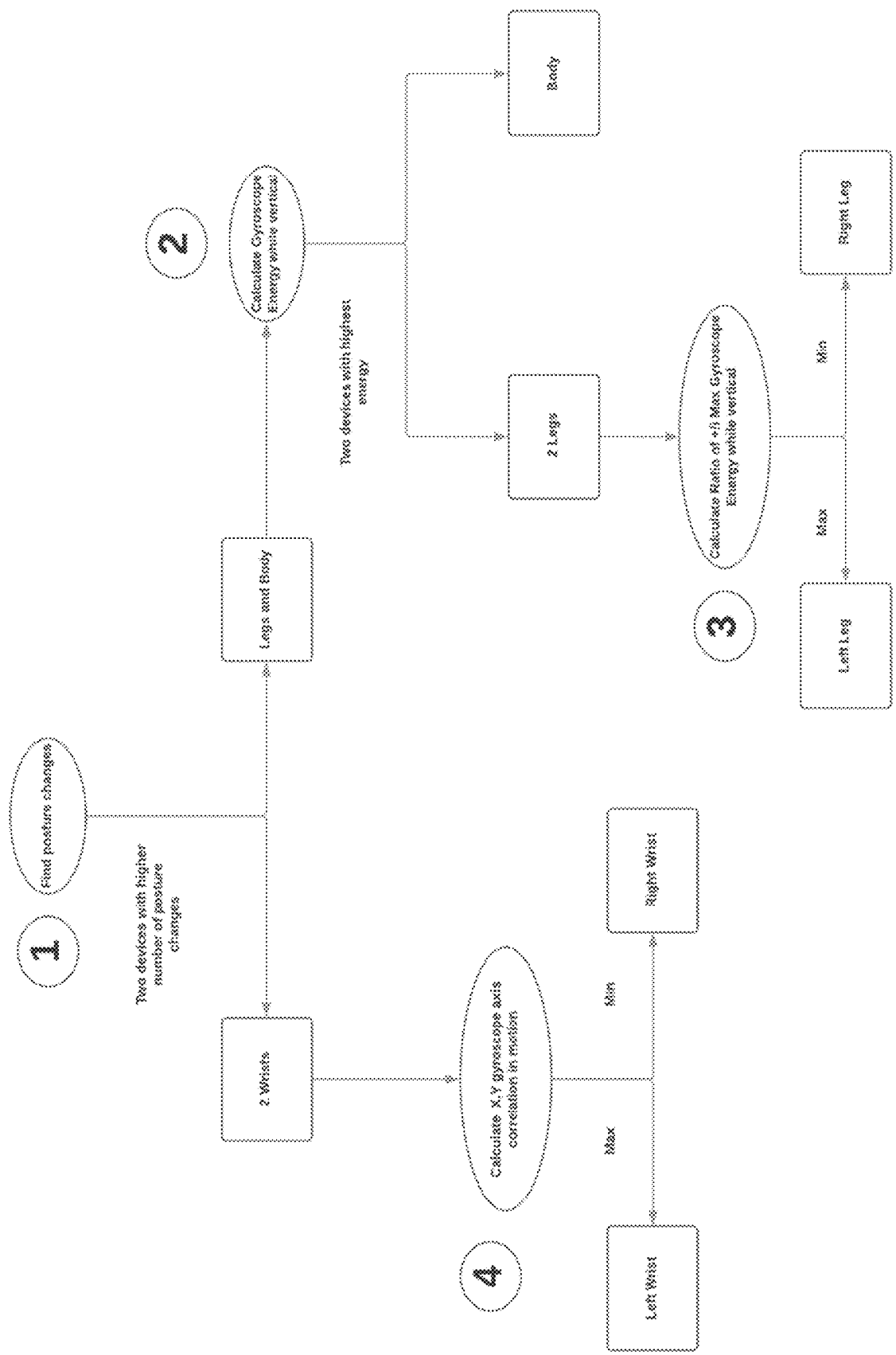
Figure 6 Device body placement identification method

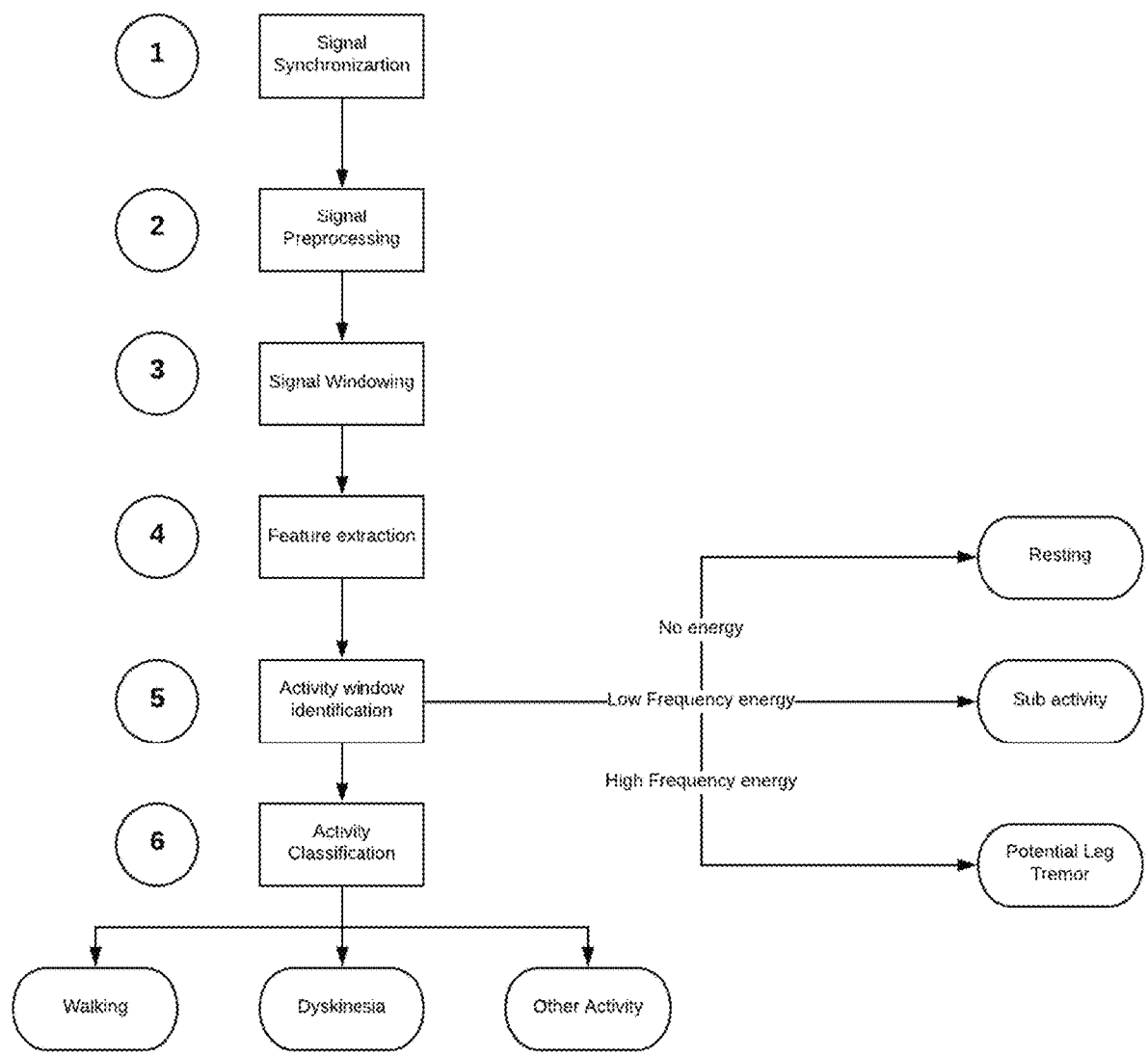
Figure 7 Activity classification

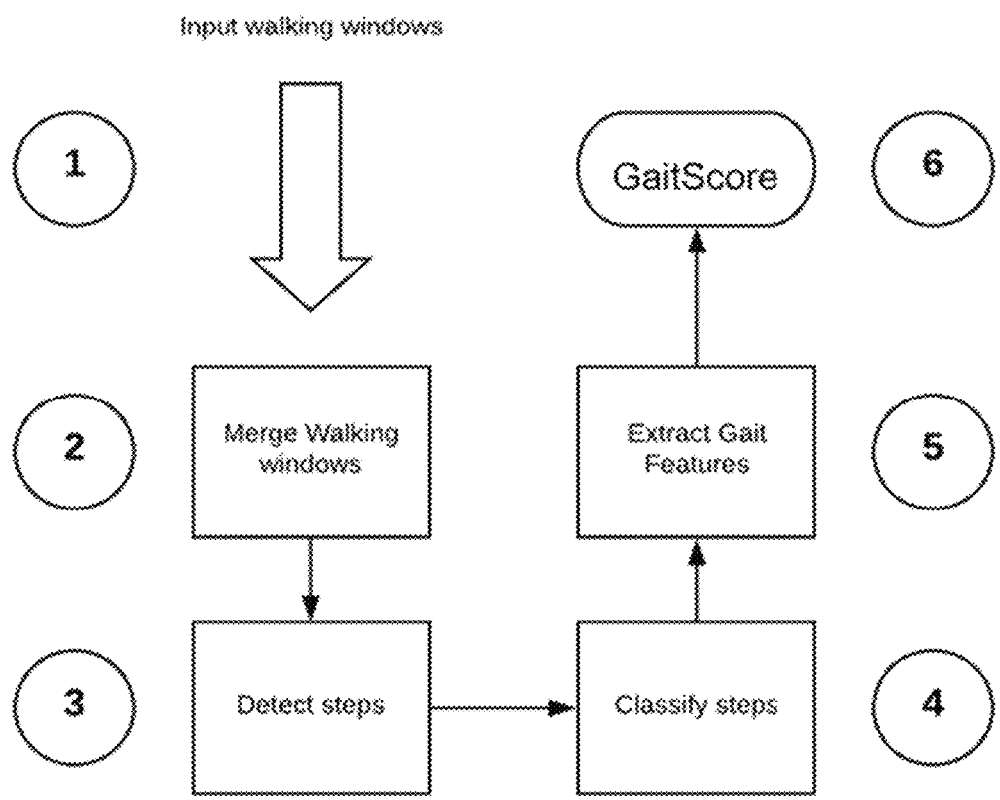
Figure 8 GaitScore algorithm

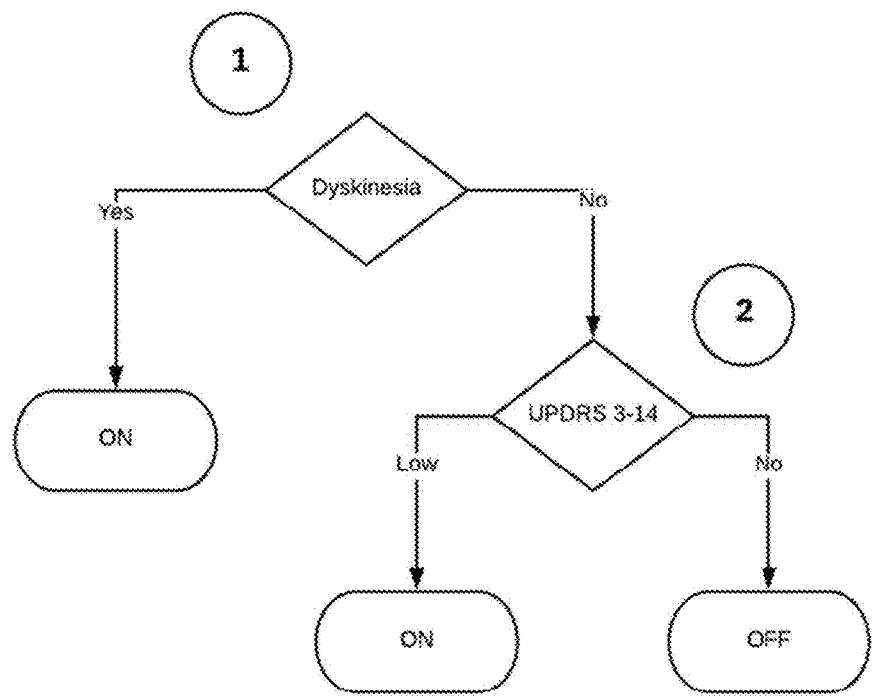
Figure 9 ON/OFF discrimination decision tree
Figure 10 Patient Mobile app medication list

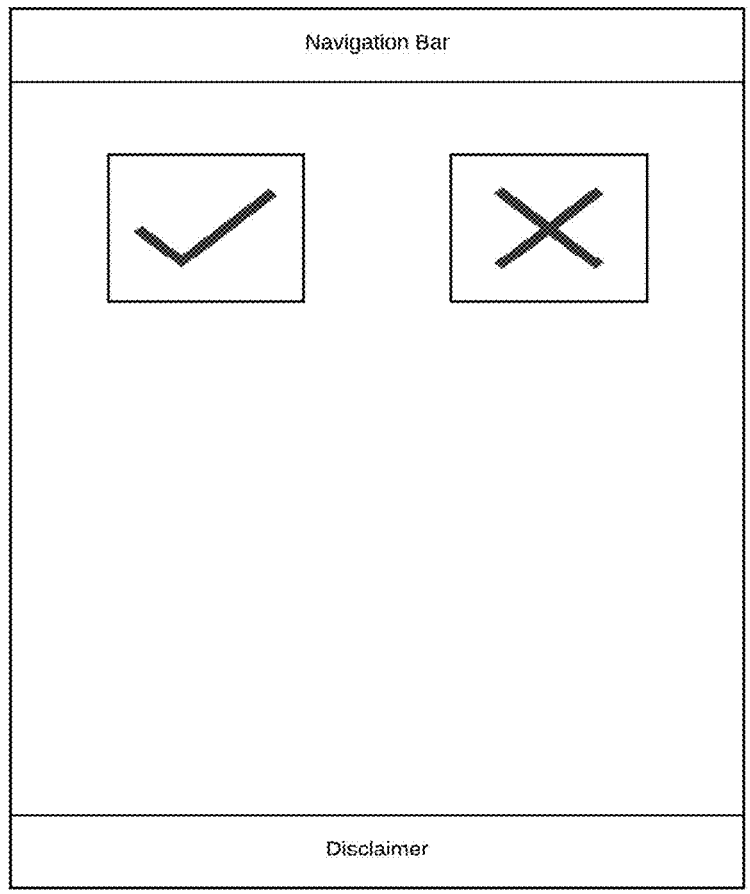
Figure 11 Patient Mobile app patient status

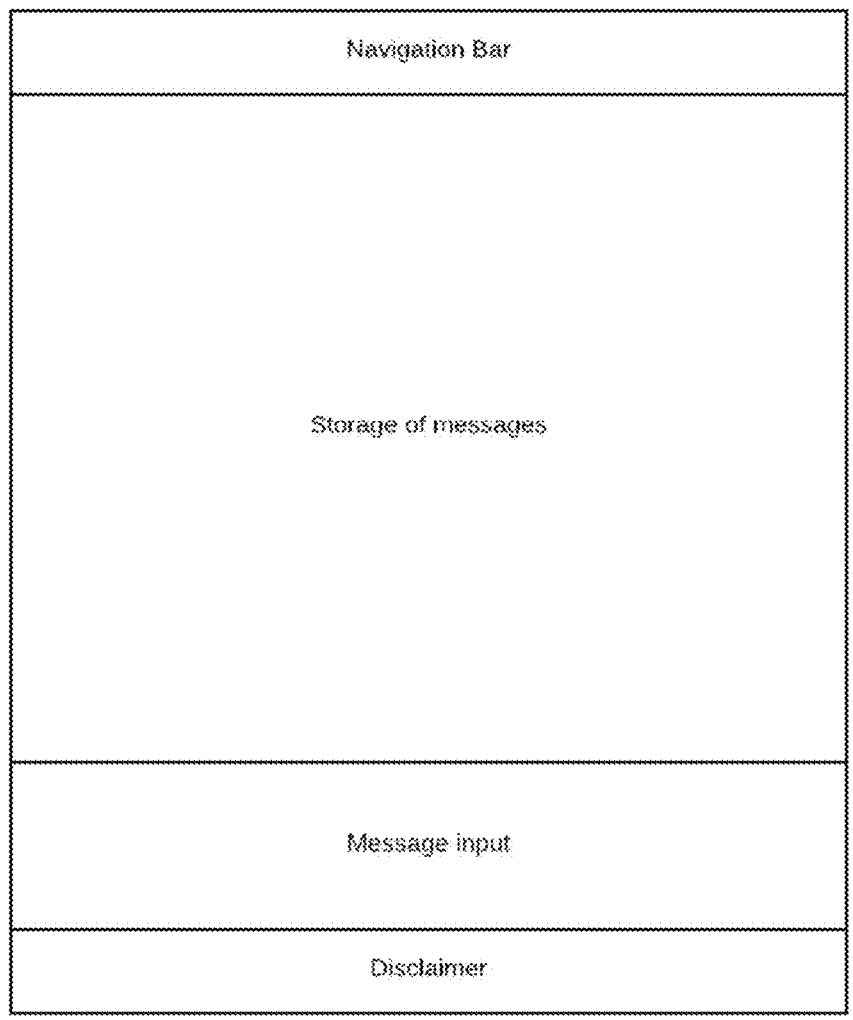
Figure 12 Patient Mobile app daily message

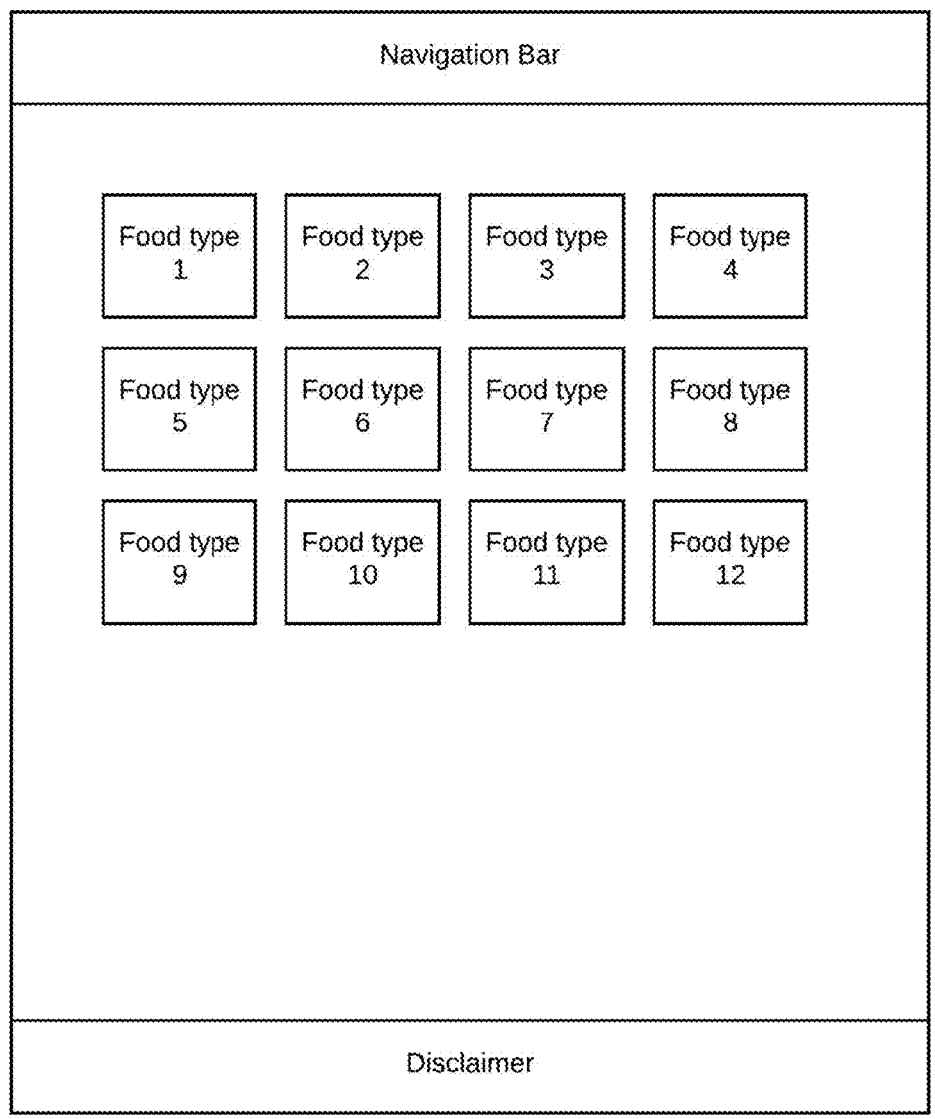
Figure 13 Patient Mobile app nutrition

Figure 14    List of physician's paired patients

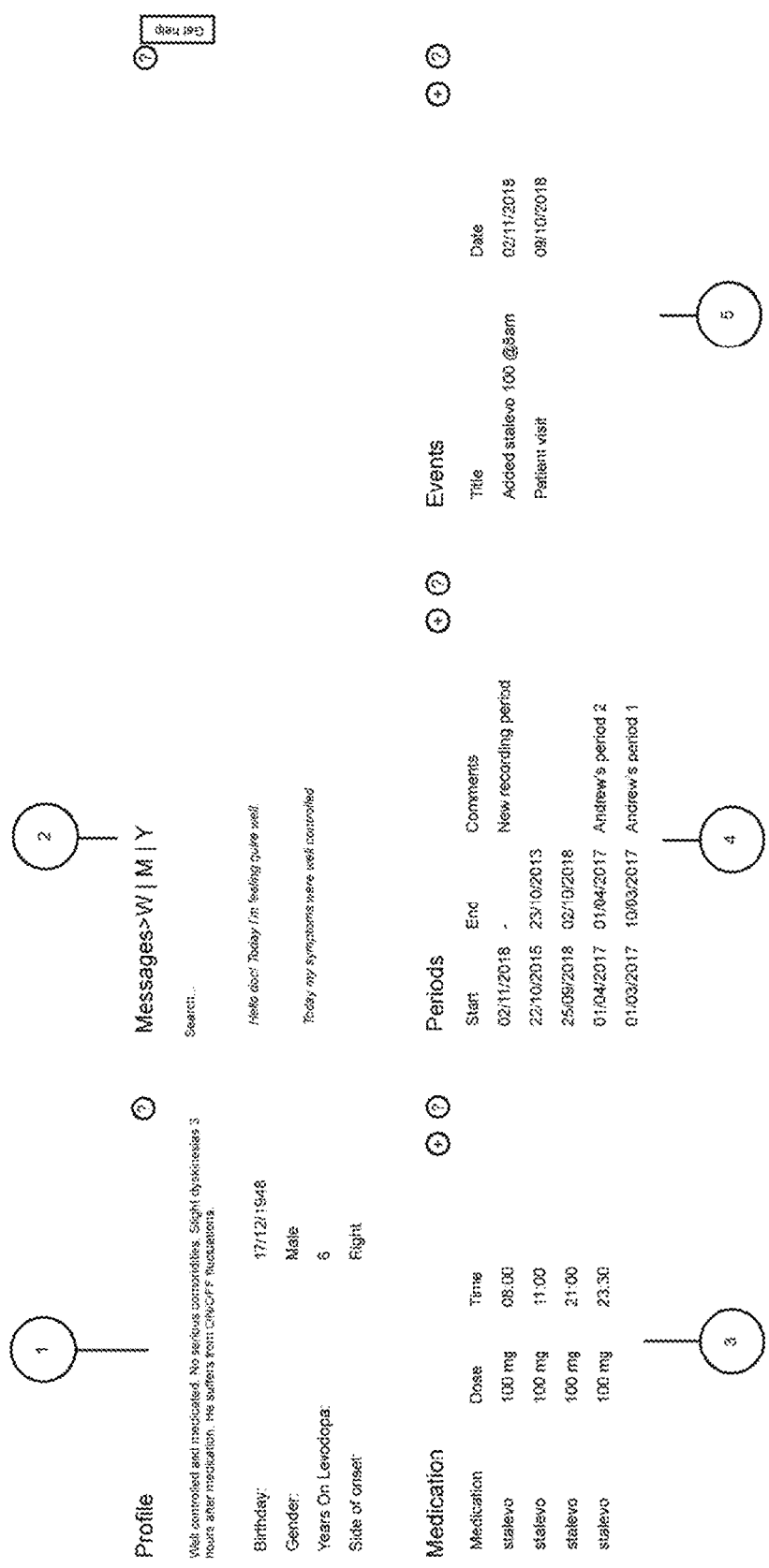
Figure 15 Patient chart

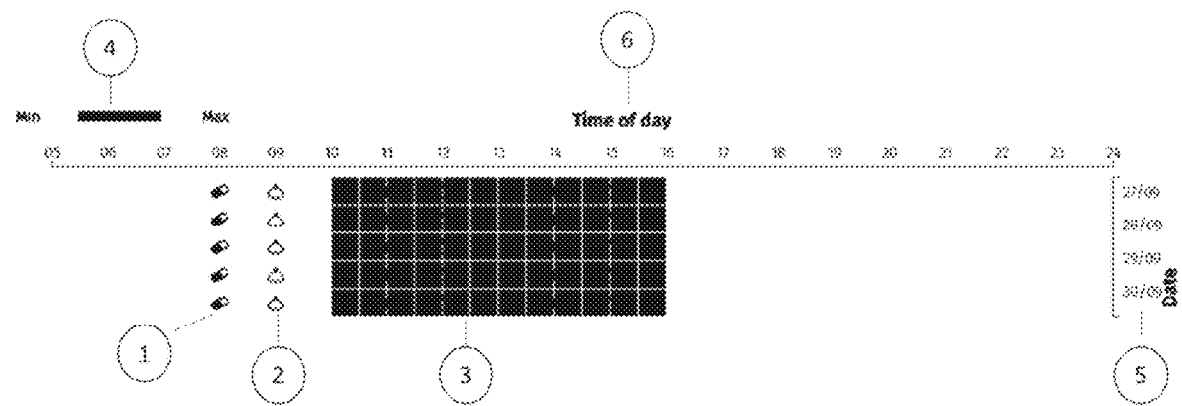
Figure 16 Symptom Heatmap
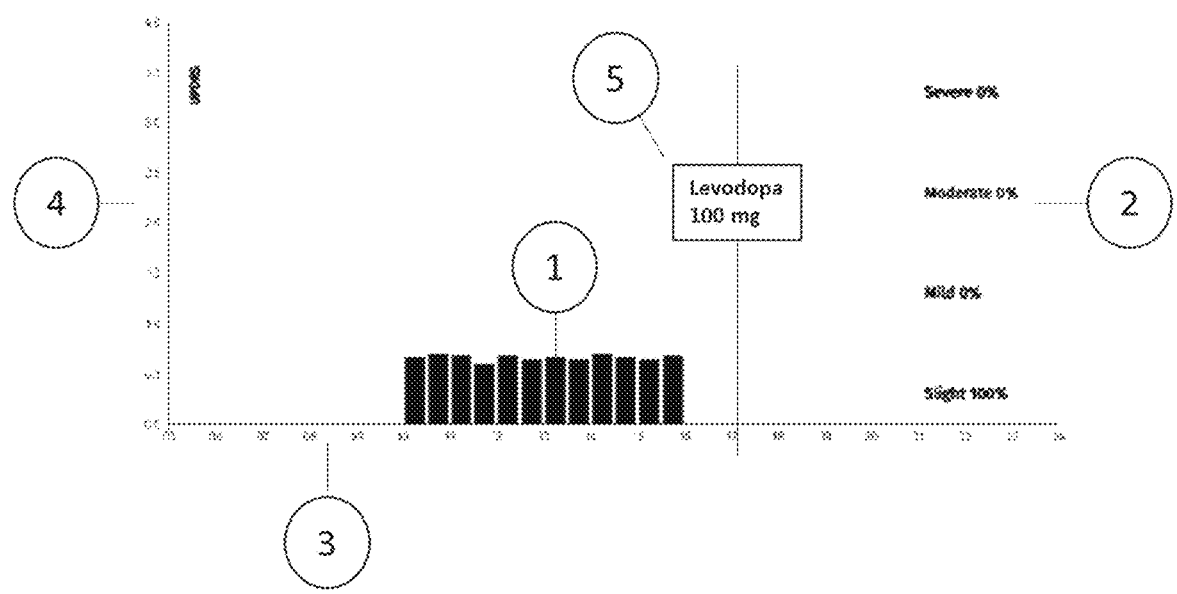
Figure 17 Symptom time chart

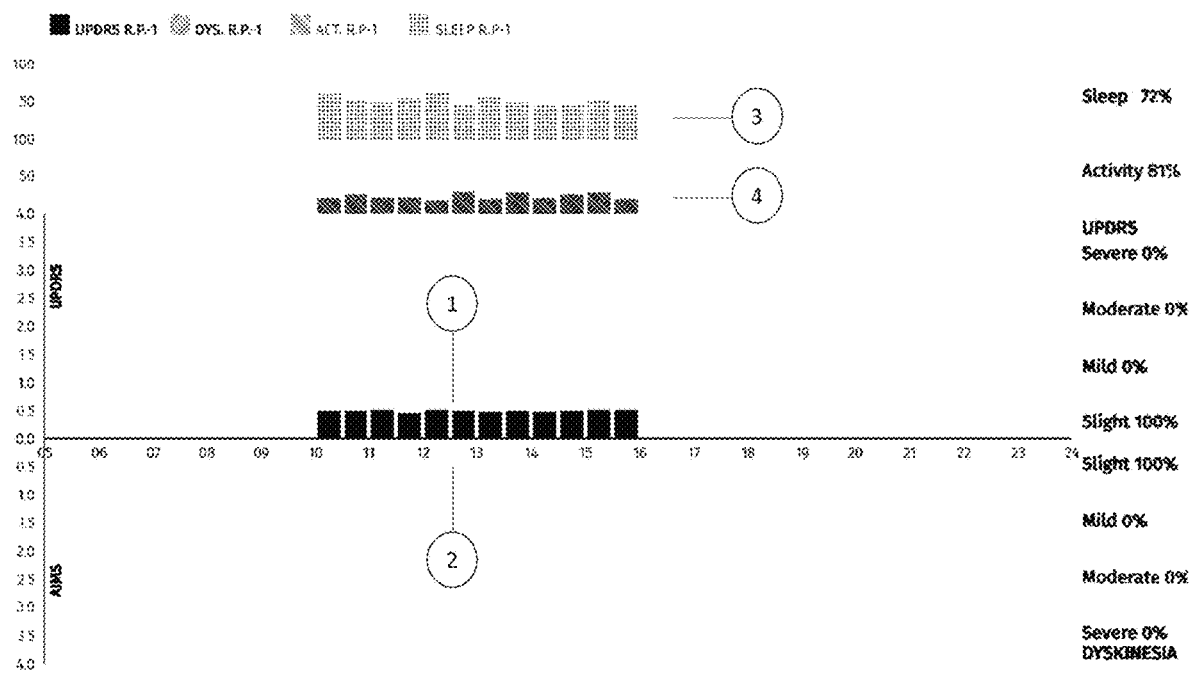
Figure 18 Overall symptom evaluation chart

MONITOR SYSTEM OF MULTIPLE PARKINSON'S DISEASE SYMPTOMS AND THEIR INTENSITY

CROSS-REFERENCE TO RELATED APPLICATIONS

This application claims priority to PCT/GR2018/000061, filed Dec. 14, 2018, the contents of which is hereby incorporated by reference in its entirety.

BACKGROUND OF THE INVENTION

The invention is a system utilizing body worn sensors to profile the motor function of Parkinson's disease b(PD) patients, integrate the outcome with patient self-reported information and translate the results to clinically relevant information, valuable for the monitoring of Parkinson's disease progression and symptom manifestation.

Parkinson's Disease

Parkinson's disease (PD) is a very common neurodegenerative disease. It is considered a chronic movement disorder. It mostly affects people over 60 years old. Parkinson's disease symptoms are caused by a gradual decrease in dopamine secretion in the human brain, which is caused by the death of dopaminergic neurons in the brain. The reason why these neurons die is still unknown. Although PD symptoms are mostly related to motor control and functionality, other non-motor symptoms, such as, cognitive impairment, sleep disorders and fatigue are also common. Disease progression over the years results in severe impairment of human motor and cognitive function, constituting patients unable to properly execute daily activities and heavily dependent on their caregivers.

Parkinson's Disease Management Problems

Parkinson's disease affects a population estimated somewhere between 7-10 million worldwide. This number is expected to grow significantly by 2030. The way PD patient treatment common practice is currently designed suffers shortcomings, namely, availability of expert physicians, subjective patient reporting and symptom quantification, and optimal medication titration.

Availability of Expert Physicians

The number of trained, expert physicians who could provide care for the growing number of PD patients is not sufficient. The problem is much worse in rural areas, where access to a physician is even harder.

Subjective Patient Reporting and Symptom Quantification

Even when an expert physician is available and an in-person clinical examination is performed, no matter the experience of the healthcare professional, the results can sometimes be insufficient to decide whether a specific already applied treating regimen is actually optimum or changes need to be applied. The reason is that PD clinical manifestations are not always observable by the physicians during the examination and patients are not always capable of precisely describing their daily state during the few minutes of the examination.

Medication Titration

Parkinson's disease medication is actually symptom alleviation and not treatment. That means a healthcare professional's work is evaluated by how well the patient's symptoms are handled. This is particularly problematic when the feedback from the patient is provided once a month or even less frequently. To make matters worse, PD patients at later stages could suffer from cognitive impairments, deteriorating the quality of communication between them and their treating physician.

Invention Rationale

To deal with the aforementioned problems of PD management, the need for a system that would offer remote, cost-efficient, objective, validated and comprehensive disease monitoring and management is identified. Such a system would extend the reach of expert physicians and support their decisions with evidence from automated symptom quantification, allowing them to design tailored and personalized treatment regimens faster, delaying the onset of unwanted drug side effects and complications.

BRIEF DESCRIPTION OF THE INVENTION

The invention pertains to a system that would accurately and with minimal user interaction, quantify human motor function, integrate self-reported information-rich status updates and translate them into clinically meaningful insight, to assist physicians perform medication titration faster, tailor the treatment to their patients' needs and take advantage of remote monitoring to care for their patients with confidence.

The invention consists of (FIG. 1):
1. A network of body-worn monitoring devices (MD's) that patients wear in different body parts. The MD's may be five or less. The MD's collect data based on an inertial measurement unit (IMU, i.e., accelerometer, gyroscope, magnetometer). Sensor data are stored locally.
2. A device with computing capabilities, defined as a Smart Box (SB), where the MD's are docked for charging, data transfer, processing and upload. When the MD's are docked into the SB, the data are automatically transferred, processed and uploaded to the cloud service without any user interaction.
3. A cloud infrastructure. The backend of the system where patient observations are stored and are available to the physician reporting tool (see next numbered item). Observations are the motor symptoms evaluated by the SB and patient provided information through the mobile application.
4. The physician reporting tool. A web application to view and download patient reports with a quantitative assessment of their PD symptoms for user specified periods. Those reports are valuable for different use cases including medication adjustments, either oral or pump-delivered.
5. A mobile application. A mobile application for patients and caregivers acting as an eDiary where a patient/caregiver can enter information regarding patient medication adherence, diary, motor and mental status. The mobile application umbrella also may include an application for the physicians to view reports and receive patient relevant alerts.

DETAILED DESCRIPTION OF THE INVENTION

Claim 1. A system collecting, recording and processing movement data based on IMU sensors, used for long-term monitoring of patients with Parkinson's disease. Parkinson's disease requires an assessment of patient movement for the assessment of symptom severity and adjustment of medication treatment by an expert physician. This assessment in the current clinical practice is based on visual observation of the patient's movement by the physician, usually performing specific tasks, and a qualitative assessment. There are some more standardized tasks and scales for a more quantitative motor symptom observation but those are rarely used in clinical practice since those are quite time consuming and are typically used in clinical studies. This system may provide an effective way for monitoring of patient movement disorders and symptom quantification in an unattended manner, either in hospital or even in a home environment. The system may include a docking station (Smart Box) (FIG. 2), which may incorporate an embedded computation unit (FIG. 2-1), five or less docking slots for the monitoring devices (FIG. 2-2). Those docking slots may be used for connecting and charging the MD's. The connectors (FIG. 2-3) may either be USB or Pogo pins, or a plate for wireless data transfer and charging. The Smart Box may also include LED indicators regarding device status (FIG. 2-4) and each MD's status (FIG. 2-5).

The Smart Box may consist of five main components:
1. the Processor (FIG. 3-1) or computation unit of the Smart Box is the core of the system. The processor may include the required CPU, RAM and I/O interfaces with the rest of the components in order to perform all required computations;
2. the GPIO Controller (FIG. 3-2) for handling the LED indications of the device. The device may have one LED per monitoring device with two states (busy and ready), one LED for power, one for internet availability and one for warnings;
3. the ethernet controller (FIG. 3-4) which connects the ethernet adapter with the processing unit;
4. the USB Hub (FIG. 3-3) which provides the interface between the MD connectors (FIG. 3-6) and the processor; and
5. the external power supply unit (FIG. 3-9).

The Smart Box may have an embedded computation unit to collect data from all MD's, process those data and upload the process outputs to the cloud. The majority of similar devices require a connection with a PC or smartphone where the actual processing takes place. However, this significantly increases the complexity of user interaction. For elder people and patients with mental and cognitive disorders this is a significant drawback. The Smart Box is a small unit with an embedded computation unit performing all the required processing. The processing can be all or partially performed in the Smart Box.

The Monitoring Device (FIG. 4-1) is a small wearable device which is attached to patient body (in up to five predefined body parts) using accessories including: 1) a wristband for wrists (FIG. 4-2), 2) a strap frame (FIG. 4-3) for wrists and shanks (used with a Velcro or other strap), 3) a clip frame for mounting on belt or trousers (FIG. 4-4).

The MD may consist of a microcontroller unit (MCU) (FIG. 5-1), an SD Card for data storage (FIG. 5-2) which could be a NAND memory, an inertial measurement with a 3-axis accelerometer, a 3-axis gyroscope and a 3-axis magnetometer (FIG. 5-3), a connector (FIG. 5-4) to attach the MD to the Smart Box, which may be based on a USB or Pogo pins for data transfer and charging, a unique ID based on EEPROM chip (FIG. 5-5) and a LiPo battery for power while in recording mode.

Each device (MD) has a 9-axis inertial measurement unit (IMU) with a 3-axis accelerometer, a 3-axis gyroscope a 3-axis magnetometer. The MDs', while not docked to Smart Box are in recording mode. In recording mode, the MCU of each monitoring device collects data from the IMU unit and logs those data in the SD card. When all MD's are docked in the Smart Box, the data stored in the SD card are transferred to the SB through serial communication. The Smart Box collects data from all MD devices and synchronizes the data as described in claim 3. The data are processed as described in claim 5. The processed data are then uploaded to the cloud.

Claim 2. The system of claim 1 wherein no patient interaction other than wearing the MD's is required to collect, record and process movement data. The device may be plugged in a power outlet and an ethernet cable and immediately power on. When the device LED's are all green the device may be ready for recording. All the user may be required to do is undock the MD's and mount them using a number of accessories on the designated body parts. The devices may automatically detect the dock/undock state and start the recording. To stop recording, the patient may only unmount the devices and docks them back to the PDMonitor Smart Box. There may be no specific docking slot on the Smart Box for each MD, since each device may be identified by its unique ID, based on an EEPROM memory. When devices are docked to the Smart Box the data transfer, data synchronization and data processing phases may take place. Data Collection from each MD may be performed based on a serial communication protocol which could be wired with USB or pogo pin connectors or even based on Bluetooth 4.0 or 5.0. During this phase the corresponding Smart Box LED's may be blinking orange. Both raw data and processed symptom evaluations may automatically be uploaded to the cloud and be available to the physician paired with the user, as described in claim 7. In the whole process the patient may not have any interaction either with the Smart Box or any other device or software. All steps may be performed automatically. The only user required action may be to dock/undock and wear the MD's using the accessories.

Claim 3. The system of claim 1 wherein the docking station synchronizes the timestamps of all monitoring devices based on a master-client synchronization schema. Each MD may have an internal real time clock (RTC) which is synced with a master MD RTC. The SB may first synchronize the master MD with the SB device clock as follows:
1. the SB device may get an accurate timestamp either using a PC embedded real time clock or with a Network Time Protocol (NTP) or using a server time with a REST call method;
2. all MD's may first get the SB time using a serial command;
3. the SB may measure the drift ($td_0$) in timestamp $t_0$ in milliseconds between the master and all slaves while devices are docked and in non-recording mode;
4. the MD's may be undocked and the RTC timer may be enabled. The RTC may count up to milliseconds. Each data row may have a millisecond timestamp t;
5. when the MD's are docked again to the SB, the drift between all slaves and the master may be calculated ($td_1$) in timestamp $t_1$;
6. each slave data row timestamp may be corrected according to the following linear correction formula:

$$t' = t + \frac{(t_1 - t)}{(t_1 - t_0)}(td_1 - td_0) + td_0.$$

Claim 4. The system in claim 1 wherein the MD's may be worn at any of the designated body parts and when docked, the docking station automatically and correctly identifies each MD's placement, given that the user has worn each MD only on one of the designated body parts. According to Cancela et al. similar body warn systems are accepted by PD patients[1]. The SB is able to automatically detect the body position of the MD's. The method may be based on the following steps illustrated in FIG. 6:
1. Identification of wrist worn MD's. This may be based on a rule of posture changes, i.e., change of the accelerometer X axis from positive (looking downwards) to negative (looking upwards). Wrists are expected to have significantly more posture changes than legs and waist.
2. Discriminate waist from legs. This discrimination is based on the signal energy while sensor orientation is vertical (patient is standing).
3. Left from right leg may be based on the ratio of maximum positive and maximum negative gyroscope energy on Z axis. Having placed the device closely to the designated shank area the right leg is expected have maximum energy on positive Z axis when walking where the left one has maximum energy on negative Z axis.
4. For wrists, the feature that may be employed for discriminating left and right may be the correlation of X and Y axes. In the left wrist this correlation is positive whereas in right wrist is negative. This discrimination also requires that the devices have been mounted near the designated wrist position. The specific method could also be used as an alternative for leg discrimination.

Claim 5. The system in claim 1 which can:
a) discriminate user activity in normal, resting, walking, dyskinetic and with tremor;

As PD progresses, patients' performance of basic activities like standing, walking, or rising from a chair becomes increasingly difficult[2]. Consequently, mobility may eventually deteriorate considerably to such an extent that patients become wheelchair-bound or even bedridden[3]. Current interventions including antiparkinsonian medication, surgery, or physical therapies are aimed at optimizing independent functioning and reducing motor complications[4]. To monitor disease progression and assess treatment effectiveness accurately, the availability of appropriate evaluation methods is required. The invention, besides PD symptoms, may also monitor basic activities of a PD patient. The system may follow a hierarchical approach for symptom detection and assessment. The main idea is to first identify "regions of interest" where specific symptoms can be evaluated with high accuracy. This requires an accurate activity detection. The main activities that need to be identified are:
Walking
Resting/Sitting
Lying
Other Each of these activities spawns further analysis for different symptoms and motor characteristics. For example, gait disturbances require the correct identification of walking, whereas tremor, dyskinesia and arm bradykinesia can be assessed during identified periods of resting.

The system may be able to discriminate between walking, dyskinetic, tremor and other activities. The activity detection algorithm of the invention (FIG. 7) may include five main steps: signal synchronization, signal filtering, feature extraction, region of interest identification, and classification. More specifically:
1. The activity algorithm may extract signal features from all body parts and also use a number of features regarding the correlation of motion of different body parts such as left and right leg or leg and torso. Therefore, signals need to be synchronized. A linear interpolation may be performed in all signals from the maximum of minimum of all device timestamps to the minimum of maximum of all device timestamps.
2. Signal Pre-processing: The features extracted may be time and frequency domain features from different low and high pass filtered variants of the accelerometer and gyroscope signals (X, Y and Z axes).
3. Signal Windowing: The whole recording signal may be split in smaller windows (in a range of 3 to 10 seconds).
4. Features may be extracted from each sub-window. A preprocessing step could be introduced here to filter out windows of no interest, i.e., no activity, to reduce the computational burden of the method.
5. Using leg energy and specific features related to high frequency content of gyroscope signals each window may be filtered in activity or non-activity window. Non-activity windows may be potential leg-tremor windows (processed by the leg tremor assessment method). Windows with higher low frequency content but less than an energy threshold may be considered as sub-activity windows and the windows with very low energy may be considered as resting ones.
6. A classifier may be trained to classify windows with significant energy in walking, dyskinetic and other activity windows. The classification may be based on time and frequency features, correlation between energy in different body parts, posture related (from accelerometer) and other features.

b) quantify the severity of dyskinesia in AIMS scale;

The system may be able to provide an assessment for dyskinesia expressed in AIMS (or other clinically relevant) scale. Levodopa induced dyskinesias (LiD) are identified as motor complications caused over the years by antiparkinsonian medication. The most common manifestation is chorea. Chorea refers to involuntary, rapid, irregular, purposeless, and unsustained movements. In general, the most affected side of a patient is the first to be affected by LiD and usually legs before arms. Although LiD may predominantly affect particular body parts, e.g., torso, head, neck and limbs, it could also affect speech and respiratory muscles. LiD could be expressed as occasional abnormal movements provoked only during active movement, e.g., walking or talking, or as violent large amplitude flinging and flailing arm movements with superimposed writhing athetoid movements.

The second most common form of LiD after chorea is dystonia, expressed as sustained muscle contractions. It occurs alone or in combination with the chorea. When dystonia is combined with chorea, it manifests as twisting of the leg on walking or the arm being pulled behind the patient's back. Dystonia can be much more disabling than chorea. Dystonias during OFF for PD patients are usually painful. Uncommon forms of LiD include akathisia (excessive motor restlessness), a high-stepped, overshooting gait, rapid alternating movements (RAM) of legs, blepharospasm, and mixed patterns of abnormal movements. According to claim 5-a) the system may detect dyskinetic activity. A number of features are used in order to detect dyskinetic activity including features extracted from a single body part such as total gyro/accelerometer energy, energy in different frequency bands, energy ratio between X and Y axes, jerk, entropy[5,6] and also features combining different body parts such as correlation between gyroscope signals. The main dyskinetic activity detection window may be 4-10 seconds and the dyskinesia may be assessed in a minute scale window interval (2-30 minutes) aggregating dyskinetic events. The severity of the dyskinesia may be a function of the dyskinesia constancy and dyskinesia severity which may be measured for each body part separately by the total gyroscope energy of the accelerometer for all windows identified as dyskinetic.

c) quantify the severity of bradykinesia in UPDRS scale in left and right side of the user;

The system may be able to quantify arm bradykinesia. Bradykinesia is defined as reduced speed when initiating and executing a single movement and progressive reduction of its amplitude, up to complete cessation during repetitive simple movement[7]. It is one of the main symptoms of PD and represents the principal motor progression marker of the disease[8]. Bradykinesia appears to result from the inability of PD patients to maximize their movement speed when required to internally drive their motor output. It has been suggested by Peschel et al.[9] that various aspects contribute to the self-initiation of movements: the selection of movement type, speed and direction and finally the movement timing. Timing dysfunction is the most characteristic for PD patients and it is not only related to motor planning and performance in PD but it is also related to time perception per se[8-10]. Bradykinesia, much like PD, does not affect all body parts in the same degree. Moreover, it is not symmetric, there is a dominant affected side. For the same side however, legs and arms may have a different degree of bradykinesia. Leg bradykinesia is apparent in the gait and therefore in the torso speed. The system may be able to quantify arm bradykinesia based on specific motion features of jerk and low frequency energy ration. The quantification of bradykinesia could be performed in all activity regions or in specific regions like resting.

d) detect and quantify the severity of wrist and leg tremor in UPDRS scale in left and right side of the user;

The system may be able to assess wrist and leg tremor in UPDRS scale. According to claim 5-*a*), the system may detect potential leg-tremor activity. The leg tremor detection method may use the high (>~3 Hz) to low (<~3 Hz) energy and the total high frequency energy to evaluate the presence of leg tremor. The total leg tremor may be assessed in a minute scale window interval (2-30 minutes). The severity of the tremor may be a function of the tremor constancy and tremor severity which may be measured for each body part separately by the total gyroscope energy of the accelerometer for all windows identified as dyskinetic.

Regarding the wrist tremor, the system may be able to assess the symptom in UPDRS scale. The tremor may be evaluated in resting or sub-activity windows as provided by the system's activity detection method described in claim 5-*a*). Wrist tremor detection may then be based on high (>~3.5 Hz) to low frequency (<~3 Hz) energy ratio and the total high frequency energy[11-13]. Tremor detection may also consider the device axis involved in tremor in order to discriminate tremor from activities like PC keyboard typing. Consequently, wrist tremor severity may be based on tremor constancy and severity evaluated based on gyroscope energy.

e) quantify the severity of gait impairment in UPDRS scale;

The system may quantify gait impairment. Gait changes are a hallmark of PD, with reductions in speed, decreased step length, altered cadence, and increased gait variability. While gait abnormalities are not pronounced in the early stages, their prevalence and severity increase with disease progression. Within 3 years of diagnosis, more than 85% of people with clinically probable PD develop gait problems. The potential consequences of gait impairments in PD are significant and include increased disability, increased risk for falls, and reduced quality of life[14].

The system's gait score may be extracted based on the method presented in FIG. 8. The method may consist of the following steps:
1. the system's activity method provides the region where walking is detected;
2. consequent walking windows are merged in walking regions;
3. for each walking region a step detection method is used which detects the heel off, the mid-swing stance and the next contact of each leg;
4. an abnormal step classifier removes outliers that may be wrongly classified as steps, which increases the specificity of step detection;
5. a number of gait related features are calculated for each step and walking region; and
6. gait score (GaitScore) per each walking region is based on gait energy, regularity and symmetry between the two legs. A gait score weight may also be extracted, based on the number of steps used to calculate the score (FIG. 8).

f) detect FoG events;

The system may extract the Freezing of Gait score. Freezing of Gait (FoG) is a phenomenon described by PD patients as the feet being "glued to the ground". In contrast to other PD symptoms, FoG is of episodic and unpredictable nature. FoG should therefore be detected on an event-basis, potentially with duration of only a few seconds[15] rather than being assessed in an overall fashion for a longer measurement. FoG comes in different sub-types:

patient shuffling forward with very short steps;
patient suddenly becoming incapable of starting to walk or failing to move forward; and
complete absence of movement.

The latter two sub-types suggest that using acceleration sensors and gyroscopes may not always be sufficient to capture signals relevant for FoG. These may sometimes consist of weight shifts between left and right leg without significant motion of body parts. A number of different features are extracted. According to the literature, the most dominant feature is the so-called "freezing index" which is the ratio between the signal energy in 3-8 Hz ("freezing" region) and 0.0-3 Hz ("normal"). Typically, the vertical accelerometer axis is used. In the invention the gyroscope signal may pass from two filters: one low pass filter <3 Hz and one high pass filter >3 Hz. If the freezing index was calculated over the whole signal then a number of false positives would occur with patients either with tremor (leg tremor) or even with dyskinesia.

The freezing index may be calculated in two specific types of regions:
before walking regions (~4 seconds before and after); and
during walking breaks.

The ration of the total energy of the two signals may be calculated for all those regions of a specific walking region. The freezing event(s) detection may be based on a threshold for the freezing index value of a walking region. The system's output may be the percent for a region of interest that the patient has a freezing index above the specific threshold.

g) provide a postural instability indicator; and

The system may provide a postural instability indicator. Postural instability and gait dysfunction (PIGD) are two of the most disabling features of PD[16,17] and contribute to recurrent falls[18]. Falls are estimated to occur at rates as high as 70% to 80% in the later stages of PD[19,20] and are the most common reason for emergency room visits. The largest motor-related surgical treatment for PIGD is quite complex and often ineffective, or may worsen balance[21,22]. Identifying those at risk of falls presents patients with the opportunity to partake in a fall-prevention program or physical therapy, which have been shown to be effective in reducing falls in PD[23]. Gait variation in PD is associated with postural instability. In addition, non-harmonic gait and increased gait variation are highly prevalent in PD[24,25]. An increased gait variation pattern, in particular stride time variation, has been associated with postural instability in PD[26]. Classification of the gait cycle involves two main phases: the stance phase and the swing phase. The system's step detection as presented in claim 5-*e*) may detect the swing phase of the gait cycle and swing duration. In fact, the method may detect the toe-off (fusing the shank gyroscope). Then the swing time ($SW_i$) of step i may be defined as $SW_i=(t_i^{heelDown}-t_{i-1}^{toeoff})$ and the swing time variability may be calculated as $$SWVAR=100*VAR(SW)/MEAN(SW)$$

h) discriminate between ON/OFF periods.

Motor fluctuations refer to alternating between ON and OFF periods that patients suffer from, after few years of medication. OFF periods are considered as those parts of the day in which patients manifest PD symptoms, with the exception of dyskinesia. On the contrary, ON periods refer to the remaining time in which patients regain movement control and the only appreciable movement alteration is dyskinesia. Medication intakes are commonly scheduled to keep a constant dopamine level in order to maximize ON time without dyskinesia and minimize the number and duration of OFF periods[27,28].

Time in OFF is currently the main parameter employed to assess pharmacological interventions and to evaluate the efficacy of different active principles. Therefore, obtaining precise information on the long-term evolution of these ON/OFF fluctuations and their short-term alternations, i.e., onset and duration, is essential to provide optimal therapy to PD patients and minimize time in OFF and dyskinesias[29]. OFF and dyskinesias are also a required input to automated PD medication treatment decision support tools[30,31]. Currently, the only available method to collect such information consists of self-reporting diaries[32]. With this method, patients annotate their motor state every waking hour during 2 or 3 days. These diaries have some important shortcomings that limit their validity and their application in clinical practice. First, they have a recall bias, and, second, they suffer from reduced compliance[32]. In consequence, a wearable device capable of collecting PD motor fluctuations in an objective and reliable way could help to overcome the limitations of self-reporting diaries and, in addition, would provide clinicians with a valuable tool to reduce OFF time and dyskinesia of their patients. A system with these characteristics would constitute an invaluable tool in PD diagnosis. Early detection of dyskinesias and motor fluctuations would help to, firstly, enhance the effectiveness of the medication through a better regimen adjustment, secondly, significantly improve the quality of life of patients and, thirdly, obtain a deeper understanding of the disease progress. Another area that could benefit from a tool with these characteristics is the clinical and epidemiological research. These studies are expensive and laborious and, often, these economic limitations affect the methodological rigor. Studies based on movement disorders are especially complicated, on the one hand by the lack of markers to establish a clear diagnosis and, on the other hand, by the lack of uniformity in diagnostic criteria.

Discrimination between ON and OFF periods are based on the body bradykinesia which is typically assessed by experts with the UPDRS 3.14 item and dyskinesia. In order to estimate the overall body dyskinesia (UPDRS 3.14 item) the system may use the UPDRS items estimated as described in claim 5-*a*) to *g*) in a linear function:

$$UP\widehat{DRS}3.14=(UPDRS3.4+UPDRS3.5+UPDRS3.6)*A+UPDRS3.10*B-C$$

Alternatively, the whole-body bradykinesia could be derived directly from signal features similarly to other symptoms. Using the estimated UDPRS 3.14 and the Dyskinesia UPDRS score the following tree was created based on the Decision Tree method on FIG. 9. The OFF of the patient may be based on no dyskinesia and high UPDRS 3.14. The High UPDRS 3.14 value may also be patient specific and adapted based on the minimum UPDRS of the patient.

Claim 6. The system in claim 1 wherein through its cloud service information feeds from the wearable sensors and self-recorded patient input through a mobile application are integrated in a clinically meaningful way. The system may be accompanied by dedicated mobile applications intended for patients, caregivers and physicians.

Mobile Patient Application's Main Features

1. Medication Adherence

At medication page a list with the medication of a patient loaded every day (FIG. 10). By selecting the dismiss (☒) or take (☑) button the patient can inform the physician if the medicine is taken or not at the scheduled time of the day.

2. Patient Status

Using the patient status page (FIG. 11), the user selects how he/she feels during the past half-hour.

3. Daily Message

The Daily message page (FIG. 12) helps the patient communicate with his/her treating physician.

4. Nutrition

Using the nutrition page (FIG. 13), the user can select the types of food consumed. The food categories are mostly based on protein because that is what could affect the medication efficacy.

Mobile Caregiver Application's Main Features

The application for caregivers essentially supports the same functionality. However, the user is now the caregiver, and the input concerns the patient the caregiver looks after.

Mobile Physician Application's Main Features

This mobile app offers basic functionality derived from the physician reporting tool described in claim 7 (FIG. 1-4). The physician is able to view a list of patients and a secondary detailed view of each patient.

Claim 7. The system may be accompanied by a cloud-based physician tool to visualize the symptoms and all other information extracted from the device and the mobile apps. Access to patient data may only be granted to authorized physicians. Patients may be paired with only one physician, who is granted access to their data. The physician tool may provide a list of all patients (FIG. 14) which may present the main patient details (FIG. 14-1) and a list of actions per patient (FIG. 14-2) including viewing of a patient chart and reports and editing patient details.

The physician tool may provide a PD related patient chart. Selecting the patient chart the physician may be able to see a summary of patient information including profile with demographics and disease history information (FIG. 15-1). All information may be entered by the physician. The messages provided by the patient via the patient mobile app message of the day (FIG. 12) feature may be displayed in a messages panel (FIG. 15-2). The current medication of the patient may be displayed in a medication panel (FIG. 15-3), the recording periods may be displayed in a periods panel (FIG. 15-4). Recording periods may be entered by the treating physician or automatically created based on data availability. Physicians may also record specific events (visits, medication changes, interventions etc.) (FIG. 15-5).

The physician reporting tool may provide a report for one or more recording periods selected by the physician. The report may consist of the following basic parts:

1. Symptom summary. A table or charts presenting a summary of different symptom evaluation including common statistics (average, standard deviation, median, min, max), time that the symptom was above predefined or user defined thresholds, data recorded and the recording period.
2. For each symptom a heatmap (FIG. 16) presents the intensity of the symptom for the whole recording period in 30-min cells (FIG. 16-3) in both time (FIG. 16-6) and day (FIG. 16-5). The intensity color is also presented in a color scale bar (FIG. 16-4). Medication adherence entered in the patient mobile app (or other medication adherence system connected to the system's cloud) can be displayed in the heatmap with the corresponding icon (FIG. 16-1). The same holds for nutrition adherence which is also displayed with a corresponding icon (FIG. 16-2).
3. For each symptom a bar chart (FIG. 17) is also provided with a time average symptom severity. The chart consists of the bars with 30-min. interval average symptom severity over the whole recoding period (FIG. 17-1), the time axis (FIG. 17-4) and the symptom intensity axis (FIG. 17-3). This chart allows the evaluation of symptom response to medication displayed in FIG. 17-5. In order to enable the better assessment of symptom severity, the severity is split in four severity zones (slight, mild, moderate and severe) and the percentage of time that the symptom severity lies within each zone is calculated and provided as depicted in FIG. 17-2.

The physician tool report may also provide a composite report by the main symptoms that physicians usually need for patient status evaluation. The report in FIG. 18 presents an example where the chart is split in 4 areas. The FIG. 18-1 is a specific overall UPDRS score based on all symptoms assessed by the system. FIG. 18-2 presents the overall patient dyskinesia in AIMS or other scale. The FIG. 18-3 presents a percentage of time patient was sleeping during each time interval, and FIG. 18-4 presents a percentage of time was active (walking and other non-dyskinetic activity). Based on those four charts physicians are able to evaluate the severity of patient fluctuations.

REFERENCES

1. Cancela J, Pastorino M, Tzallas A T, et al. Wearability assessment of a wearable system for Parkinson's disease remote monitoring based on a body area network of sensors. *Sensors* (Switzerland). 2014; 14(9). doi:10.3390/s140917235
2. Alves G, Wentzel-Larsen T, Aarsland D, Larsen J P. Progression of motor impairment and disability in Parkinson disease. *Neurology.* 2005; 65(9):1436-1441. doi: 10.1212/01.wnl.0000183359.50822.f2
3. Hoehn M M, Yahr M D. Parkinsonism: onset, progression and mortality. *Neurology.* 1967; 17(5):427-442. http://www.ncbi.nlm.nih.gov/pubmed/6067254. Accessed Oct. 2, 2014.
4. Keus S H J, Bloem B R, Hendriks E J M, Bredero-Cohen A B, Munneke M, Practice Recommendations Development Group. Evidence-based analysis of physical therapy in Parkinson's disease with recommendations for practice and research. *Mov Disord.* 2007; 22(4):451-460. doi: 10.1002/mds.21244
5. Tsipouras M G, Tzallas A T, Rigas G, Tsouli S, Fotiadis D I, Konitsiotis S. An automated methodology for levodopa-induced dyskinesia: Assessment based on gyroscope and accelerometer signals. *Artif Intell Med.* 2012; 55(2):127-135. doi:10.1016/J.ARTMED.2012.03.003
6. Tsipouras M G, Tzallas A T, Rigas G, Bougia P, Fotiadis D I, Konitsiotis S. Automated Levodopa-induced dyskinesia assessment. *Conf Proc. Annu Int Conf IEEE Eng Med Biol Soc IEEE Eng Med Biol Soc Annu Conf.* 2010; 2010:2411-2414. doi:10.1109/IEMBS.2010.5626130
7. Marsden C D. The mysterious motor function of the basal ganglia: the Robert Wartenberg Lecture. *Neurology.* 1982; 32(5):514-539. http://www.ncbi.nlm.nih.gov/pubmed/7200209. Accessed Sep. 14, 2016.
8. Maetzler W, Liepelt I, Berg D. Progression of Parkinson's disease in the clinical phase: potential markers. *Lancet Neurol.* 2009; 8(12):1158-1171. doi:10.1016/S1474-4422(09)70291-1
9. Eckert T, Peschel T, Heinze H-J, Rotte M. Increased pre-SMA activation in early PD patients during simple self-initiated hand movements. *J Neurol.* 2006; 253(2): 199-207. doi:10.1007/s00415-005-0956-z
10. Artieda J, Pastor M A, Lacruz F, Obeso J A. Temporal discrimination is abnormal in Parkinson's disease. *Brain.* 1992; 115 Pt 1(1):199-210. doi:10.1093/brain/115.1.199
11. Rigas G, Gatsios D, Fotiadis D I, et al. Tremor UPDRS estimation in home environment. In: 2016 38*th Annual International Conference of the IEEE Engineering in Medicine and Biology Society* (*EMBC*). Vol 2016. IEEE; 2016:3642-3645. doi:10.1109/EMBC.2016.7591517
12. Rigas G, Tzallas A T, Tsipouras M G, et al. Assessment of tremor activity in the Parkinson's disease using a set of wearable sensors. *IEEE Trans Inf Technol Biomed.* 2012; 16(3):478-487. doi:10.1109/TITB.2011.2182616
13. Rigas G, Tzallas A T, Tsalikakis D G, Konitsiotis S, Fotiadis D I. Real-time quantification of resting tremor in the Parkinson's disease. *Conf Proc. Annu Int Conf IEEE Eng Med Biol Soc IEEE Eng Med Biol Soc Annu Conf.* 2009; 2009:1306-1309. doi:10.1109/IEMBS.2009.5332580
14. Kelly J M, Strecker R E, Bianchi M T. Recent Developments in Home Sleep-Monitoring Devices. *ISRN Neurol.* 2012.
15. Tripoliti E E, Tzallas A T, Tsipouras M G, et al. Automatic detection of freezing of gait events in patients with Parkinson's disease. *Comput Methods Programs Biomed.* 2013; 110(1):12-26. doi:10.1016/j.cmpb.2012.10.016
16. Playfer J R. Falls and Parkinson's disease. *Age Ageing.* 2001; 30(1):3-4. doi:10.1093/ageing/30.1.3
17. Morris M E. Movement disorders in people with Parkinson disease: a model for physical therapy. *Phys Ther.* 2000; 80(6):578-597. http://www.ncbi.nlm.nih.gov/pubmed/10842411. Accessed Oct. 19, 2018.
18. Kerr G K, Worringham C J, Cole M H, Lacherez P F, Wood J M, Silburn P A. Predictors of future falls in Parkinson disease. *Neurology.* 2010; 75(2):116-124. doi: 10.1212/VVNL.0b013e3181e7b688
19. Pickering R M, Grimbergen Y A M, Rigney U, et al. A meta-analysis of six prospective studies of falling in Parkinson's disease. *Mov Disord.* 2007; 22(13):1892-1900. doi:10.1002/mds.21598

20. Miller S C, Mor V N T. The role of hospice care in the nursing home setting. *J Palliat Med.* 2002; 5(2):271-277. doi:10.1089/109662102753641269
21. Mancini M, Rocchi L, Horak F B, Chiari L. Effects of Parkinson's disease and levodopa on functional limits of stability. *Clin Biomech.* 2008; 23(4):450-458. doi:10.1016/j.clinbiomech.2007.11.007
22. Beuter A, Hernández R, Rigal R, Modolo J, Blanchet P J. Postural sway and effect of levodopa in early Parkinson's disease. *Can J Neurol Sci.* 2008; 35(1):65-68. http://www.ncbi.nlm.nih.gov/pubmed/18380279. Accessed Oct. 20, 2018.
23. Protas E J, Mitchell K, Williams A, Qureshy H, Caroline K, Lai E C. Gait and step training to reduce falls in Parkinson's disease. *NeuroRehabilitation.* 2005; 20(3):183-190. http://www.ncbi.nlm.nih.gov/pubmed/16340099. Accessed Oct. 20, 2018.
24. Hausdorff J M, Cudkowicz M E, Firtion R, Wei J Y, Goldberger A L. Gait variability and basal ganglia disorders: Stride-to-stride variations of gait cycle timing in parkinson's disease and Huntington's disease. *Mov Disord.* 1998; 13(3):428-437. doi:10.1002/mds.870130310
25. Blin O, Ferrandez A M, Serratrice G. Quantitative analysis of gait in Parkinson patients: increased variability of stride length. *J Neurol Sci.* 1990; 98(1):91-97. http://www.ncbi.nlm.nih.gov/pubmed/2230833. Accessed Oct. 20, 2018.
26. Schaafsma J D, Giladi N, Balash Y, Bartels A L, Gurevich T, Hausdorff J M. Gait dynamics in Parkinson's disease: relationship to Parkinsonian features, falls and response to levodopa. *J Neurol Sci.* 2003; 212(1-2):47-53. http://www.ncbi.nlm.nih.gov/pubmed/12809998. Accessed Oct. 20, 2018.
27. Antonini A. Apomorphine and levodopa infusion therapies for advanced Parkinson's disease. *J Mov Disord.* 2009; 2(1):4-9. doi:10.14802/jmd.09002
28. Rodríguez-Molinero A, Pérez-Martínez D A, Gálvez-Barrón C, et al. Remote control of apomorphine infusion rate in Parkinson's disease: Real-time dose variations according to the patients' motor state. A proof of concept. *Parkinsonism Relat Disord.* 2015; 21(8):996-998. doi:10.1016/j.parkreldis.2015.04.030
29. Drapier S, Gillioz A-S, Leray E, et al. Apomorphine infusion in advanced Parkinson's patients with subthalamic stimulation contraindications. *Parkinsonism Relat Disord.* 2012; 18(1):40-44. doi:http://dx.doi.org/10.1016/j.parkreldis.2011.08.010
30. Rigas G, Bougia P, Baga D, et al. A decision support tool for optimal Levodopa administration in Parkinson's disease. In: *Information Technology and Applications in Biomedicine (ITAB)*, 2010 10th IEEE International Conference On. IEEE; 2010:1-6.
31. Bohanec M, Miljković D, Valmarska A, et al. A decision support system for Parkinson disease management: expert models for suggesting medication change. *J Decis Syst.* 2018. doi:10.1080/12460125.2018.1469320
32. Papapetropoulos S S. Patient Diaries As a Clinical Endpoint in Parkinson's Disease Clinical Trials. *CNS Neurosci Ther.* 2012; 18(5):380-387. doi:10.1111/j.1755-5949.2011.00253.x

| Related Patents | |
|---|---|
| U.S. Pat. No. 9,393,418 | Movement disorder therapy system, devices and methods of tuning |
| U.S. Pat. No. 8,920,345 | System and apparatus for continuous monitoring of movement disorders |
| U.S. Pat. No. 9,826,921 | Detection of hypokinetic and hyperkinetic states |
| U.S. Pat. No. 8,702,629 | Movement disorder recovery system and method for continuous monitoring |
| U.S. Pat. No. 7,369,896 | Systems and methods for treating movement disorders |
| US00247910A1 | Method and apparatus for Classification of Movement status in PD |
| US00281830A1 | Collaborative marketplace platform system for research and management of chronic diseases |
| 00301119A1 | Method and apparatus for continuous measurement of motor symptoms in PD and essential tremor with wearable sensors |
| 00076348A1 | Complete integrated system for continuous monitoring and analysis-of movement disorders (APDM) |
| 0074304A1 | Method and Device to manage FoG in patients with moving disorders (RUSH) |
| 008639955S | Wearable movement monitor |

The invention claimed is:

1. A system arranged for collecting, recording and processing movement data based on inertial measurement unit (IMU) sensors, worn on one or more of wrists, ankles and waist, arranged for long-term monitoring of patients with Parkinson's disease, comprising:
  a) a docking station with an embedded computation unit to gather, process and transfer movement data;
  b) a number of IMU sensor-based monitoring devices (MD's) configured to be worn on one of the one or more of the wrists, ankles, and waist;
  c) a web application to be used by a physician, to view IMU sensor-based motor symptoms of a patient expressed in a clinical scale;
  d) a mobile application to self-report patient disease status, medication and nutrition; and
  e) a cloud infrastructure to support communication between all parts and aggregate information feeds;
  wherein the docking station is arranged for, when the monitoring devices are docked after the patient has worn each monitoring device on only one body part, automatically detecting for each monitoring device whether such monitoring device had been worn on one of the one or more of the wrists, ankles, and waist by:
  discriminating wrist worn monitoring devices from waist or ankle worn monitoring devices based on a change of accelerometer X axis from positive to negative;
  subsequently:
    if the monitoring device is determined to have been worn on the wrists, discriminating left wrist from right wrist, based on a correlation of X and Y axes; or
    if the monitoring device is determined to have been worn on the waist or ankle,
    discriminating waist from ankles, based on signal energy from the monitoring devices while sensor orientation is vertical; and
    subsequently, if the monitoring device is determined to have been worn on the ankles, discriminating left ankle from right ankle, based on a ratio of maximum positive and maximum negative gyroscope energy on Z axis.

2. The system of claim 1, wherein no patient interaction other than wearing the monitoring devices MD's is required to collect, record and process movement data.

3. The system of claim 1, wherein each monitoring device has an internal real time clock, and the docking station synchronizes timestamps of all monitoring devices based on a master-client synchronization schema.

4. The system of claim 1, further configured to:
a) discriminate user activity in normal, resting, lying, walking, dyskinetic, with tremor and other;
b) quantify a severity of dyskinesia in AIMS scale;
c) quantify a severity of bradykinesia in UPDRS scale in left and right side of a user;
d) detect and quantify a severity of wrist and leg tremors in UPDRS scale in left and right side of the user;
e) quantify a severity of gait impairment in UPDRS scale;
f) detect freezing of gait (FoG) events;
g) provide a postural instability indicator; and
h) discriminate between ON/OFF periods.

5. The system of claim 4, wherein the system is arranged for one or more of:
a) discriminating user activity in normal, resting, lying, walking, dyskinetic, with tremor and other, by:
synchronizing and extracting signal features from all body parts and using a number of features regarding a correlation of motion of a different body;
pre-processing the extracted signal features;
splitting the pre-processed signal features in windows;
extracting features from each window;
filtering each window into activity or non-activity window using leg energy and features related to high frequency content of gyroscope signals, wherein non-activity windows are potential leg-tremor windows, windows with higher low frequency content but less than an energy threshold are considered as sub-activity windows, and the windows with very low energy are considered as resting windows;
using a trained classifier to classify windows with significant energy in walking, dyskinetic and other activity windows;
b) quantifying the severity of dyskinesia in AIMS scale by:
determining dyskinesia by aggregating dyskinetic events over a minute scale window interval; and
quantifying the severity of the dyskinesia as a function of dyskinesia constancy and dyskinesia severity;
c) quantifying the severity of bradykinesia in UPDRS scale in left and right side of the user based on specific motion features of jerk and low frequency energy ration;
d) detecting and quantify the severity of leg tremor in UPDRS scale by:
assessing a total leg tremor in a minute scale window interval; and
determining the severity of the tremor as a function of tremor constancy and tremor severity;
e) detecting and quantify the severity of wrist tremor in UPDRS scale based on the tremor constancy and the tremor severity evaluated based on gyroscope energy;
f) quantifying the severity of gait impairment in UPDRS scale by:
determining a region where walking is detected from the system's activity method;
merged walking windows in walking regions;
for each walking region using a step detection method which detects a heel off, a mid-swing stance and a next contact of each leg;
using an abnormal step classifier to remove outliers that are wrongly classified as steps;
calculating a number of gait related features for each step and walking region; and
basing gait score (GaitScore) per each walking region on gait energy, regularity and symmetry between two legs;
g) detecting freezing of gait (FoG) events by:
calculating a freezing index in two specific types of regions:
i. before walking regions; and
ii. during walking breaks;
calculating a ratio of total energy of signals for all those regions of a specific walking region; and
basing FoG event(s) detection on a threshold for a freezing index value of a walking region;
h) providing a postural instability indicator based on an increased gait variation pattern; and
i) discriminate between ON/OFF periods based on the bradykinesia and dyskinesia.

6. The system of claim 1, wherein, through a cloud service, information feeds from the monitoring devices and self-recorded patient input through the mobile application are integrated in a clinically meaningful way.

7. The system of claim 6, wherein the mobile application includes one or more of:
a list with medication of a patient, and selection means enabling the patient to inform a physician if the medication is taken or not at a scheduled time of day;
a patient status selector, enabling the patient to select how he/she feels during a past half-hour;
a message page enabling the patient to communicate with his/her treating physician; and
a nutrition selector enabling the patient to select types of food consumed.

8. The system of claim 1, wherein a physician reporting tool offers secure, restricted access to online graphical representations of quantitative information on PD symptoms to a registered treating physician.

9. The system of claim 1, wherein the docking station includes an ethernet controller connecting an ethernet adapter to the embedded computation unit, and the embedded computation unit being configured to collect data from all MD's, process collected data and upload process outputs to a cloud.

10. The system of claim 1, wherein the monitoring devices are arranged for automatically detecting an undock state and starting recording.

11. The system of claim 1, wherein the docking station is arranged for, upon docking of the monitoring devices back to the docking station, performing data transfer, data synchronization and data processing and automatically uploading the data to a cloud to be available to the physician.

12. A method for monitoring a Parkinson's disease patient, including:
plugging a docking station in a power outlet and an ethernet cable;
undock a plurality of monitoring devices from the docking station and mount each of the plurality of monitoring devices on one or more of wrists, ankles and waist of the patient;
the plurality of monitoring devices automatically detecting a undock state and starting recording;
unmount the plurality of monitoring devices and dock the plurality of monitoring devices back to the docking station;

when the plurality of monitoring devices are docked, perform data transfer, data synchronization and data processing;

when the plurality of monitoring devices are docked after the patient has worn each monitoring device on only one body part, automatically detecting for each monitoring device whether such monitoring device had been worn on one of the one or more of the wrists, ankles, and waist by:

discriminating wrist worn monitoring devices from waist or ankle worn monitoring devices based on change of accelerometer X axis from positive to negative;

subsequently:
  if the monitoring device is determined to have been worn on the wrists, discriminating left wrist from right wrist, based on a correlation of X and Y axes;
  if the monitoring device is determined to have been worn on the waist or ankle, discriminating waist from ankles, based on signal energy from the monitoring devices while the monitoring device orientation is vertical; and
  subsequently, if the monitoring device is determined to have been worn on the ankles, discriminating left ankle from right ankle, based on a ratio of maximum positive and maximum negative gyroscope energy on Z axis; and-automatically uploading data to a cloud to be available to a physician paired with the patient.

13. The system of claim 1, wherein the clinical scale is an AIMS scale or an UPDRS scale.

* * * * *